United States Patent
Benkreira et al.

(10) Patent No.: US 11,146,686 B1
(45) Date of Patent: Oct. 12, 2021

(54) SYSTEMS FOR IDENTIFYING THE ANSWERING PARTY OF AN AUTOMATED VOICE CALL

(71) Applicant: Capital One Services, LLC, McLean, VA (US)

(72) Inventors: Abdelkader Benkreira, New York, NY (US); Joshua Edwards, Philadelphia, PA (US); Michael Mossoba, Arlington, VA (US)

(73) Assignee: CAPITAL ONE SERVICES, LLC, McLean, VA (US)

( * ) Notice: Subject to any disclaimer, the term of this patent is extended or adjusted under 35 U.S.C. 154(b) by 0 days.

(21) Appl. No.: 16/897,197

(22) Filed: Jun. 9, 2020

(51) Int. Cl.
   *H04M 3/533* (2006.01)
   *H04M 3/436* (2006.01)
   *G10L 15/22* (2006.01)
   *H04M 1/82* (2006.01)

(52) U.S. Cl.
   CPC ............. *H04M 3/533* (2013.01); *G10L 15/22* (2013.01); *H04M 1/82* (2013.01); *H04M 3/436* (2013.01); *H04M 2250/74* (2013.01)

(58) Field of Classification Search
   CPC ......... G10L 15/22; H04M 1/82; H04M 3/436; H04M 3/533; H04M 2250/74
   USPC ..... 379/67.1–88.28, 142.01–142.18, 201.01; 455/412.1–426.1; 709/201–207, 217–248
   See application file for complete search history.

(56) References Cited

U.S. PATENT DOCUMENTS

| | | | |
|---|---|---|---|
| 5,371,787 A | 12/1994 | Hamilton | |
| 5,828,731 A | 10/1998 | Szlam et al. | |
| 6,226,360 B1 * | 5/2001 | Goldberg | H04M 3/46 379/69 |
| 7,386,101 B2 * | 6/2008 | Pugliese | H04L 12/2854 379/69 |
| 9,313,312 B2 | 4/2016 | Merrow et al. | |
| 9,596,578 B1 * | 3/2017 | Clark | H04M 3/53383 |
| 10,277,745 B1 | 4/2019 | Araujo et al. | |
| 10,530,928 B1 | 1/2020 | Ouimette et al. | |
| 2003/0185352 A1 * | 10/2003 | Savage | H04M 3/5158 379/67.1 |
| 2010/0217816 A1 * | 8/2010 | Smelyansky | H04M 3/53333 709/206 |
| 2013/0151248 A1 | 6/2013 | Baker, IV | |

FOREIGN PATENT DOCUMENTS

| | | |
|---|---|---|
| JP | 2015515646 A | 5/2015 |
| WO | 2019243805 A1 | 12/2019 |

OTHER PUBLICATIONS

AMD Technology (https://www.evs7.com/blog/answering-machine-detection-amd); Feb. 1, 2016.

* cited by examiner

*Primary Examiner* — Hemant S Patel

(74) *Attorney, Agent, or Firm* — Troutman Pepper Hamilton Sanders LLP; Christopher J. Forstner

(57) ABSTRACT

Disclosed herein are systems and methods for determining whether an automated telephone call has been answered by a particular user, a different person, or a voicemail service. In response to determining that the call has been answered by the user, a different person, or a voicemail service, the systems and methods can output different respective messages, initiate messaging to the user via alternate communication paths, or perform other actions.

17 Claims, 5 Drawing Sheets

SYSTEMS FOR IDENTIFYING THE ANSWERING PARTY OF AN AUTOMATED VOICE CALL

FIELD OF INVENTION

The present disclosure relates generally to identifying and/or determining who or what has answered an automated voice call (e.g., a telephone call). More specifically, the disclosed technology relates to determining whether an automated voice call has been answered by a customer, a person who is not the customer, and/or a voicemail service (e.g., an automated voicemail service).

BACKGROUND

Many businesses or other organizations contact customers and/or prospective customers via automated or computer-assisted voice calls, such as telephone calls. The content or nature of such messages can often include personal or sensitive information, and a customer may desire that such information not be provided to the automated voicemail service or a person who is not the customer. Further, the content or nature of the message may be such that the organization desires to, or is required to, confirm that the message was received by the customer. For example, a message may include personal or time-sensitive information, and the organization may not want to merely leave a voicemail message and rely on the assumption that the customer will eventually listen to the recorded voicemail messages. Instead, the organization may want to confirm that the message was provided to the customer during a voice call to which the customer was a party.

Existing systems, however, are typically unable to determine whether a voice call has been answered by a specific customer, a person who is not the customer, and/or an automated voicemail service. Thus, existing systems can sometimes provide content-sensitive or time-sensitive information to a person who is not the customer. Existing systems can also provide content-sensitive or time-sensitive information to a customer's automated voicemail service without the organization receiving any confirmation that the customer actually received or listened to the recorded voicemail message.

Accordingly, there is a need for improved devices, systems, and methods that can identify and/or determine—in real-time or in near real-time—whether an automated voice call has been answered by a customer, a person who is not the customer, and/or a voicemail service (e.g., an automated voicemail service).

SUMMARY

The disclosed technology includes systems and methods relating to the identification of an answering party for detecting harassing communication. More specifically, the disclosed technology includes systems and methods for identifying and/or determining whether an automated voice call has been answered by a customer, a person who is not the customer, and/or a voicemail service (e.g., an automated voicemail service).

The disclosed technology includes a method that can include receiving audio data associated with a call to a customer device (e.g., user device) and detecting, from the audio data, one or more audible rings of an internal ring tone indicative of a pending attempt to connect the call. The method can include detecting, from the audio data, that the call is connected and determining a total number of the one or more audible rings that occurred before the call was answered. The method can include comparing the total number of the one or more audible rings to historical ring data associated with contact information associated with the call, and the method can include determining, based on the comparison of the total number of the one or more audible rings to the historical ring data, a likelihood that the call has been answered by the automated voicemail service. The method can include outputting a voicemail-focused recording for the customer in response to determining the likelihood that the call has been answered by the automated voicemail service is greater than or equal to a predetermined threshold. The method can include outputting a person-focused recording for the customer in response to determining the likelihood that the call has been answered by the automated voicemail service is less than the predetermined threshold, and the person-focused recording can include information of a higher level of confidentiality than the voice-mail focused recording.

The disclosed technology includes a non-transitory, computer-readable medium having instructions stored thereon that, when executed by one or more processors, causes a system to receive audio data associated with a call to a customer device (e.g., user device). The audio data can be detected by, and transmitted from, a customer device associated with a customer (e.g., a user), a voicemail service associated with the customer, or the like. The instructions can cause the system to detect an utterance from the audio data and compare the utterance to stored data. The utterance can include any collection of sounds (e.g., words, sentences, other sounds) as indicated by the audio data. The utterance can be associated with a sound provided by a person, a recording of a sound provided by a person, an automated recording, or the like. The stored data can be indicative of one or more known voicemail greetings. The instructions can cause the system to, based on the comparison, determine whether the utterance was generated by an automated voicemail service, and the instructions can cause the system to, in response to determining that the utterance was generated by the automated voicemail service (e.g., by determining that the utterance is above a threshold level of similarity as compared to the stored data), output a voicemail-focused recording for the customer. If the system determines that the utterance was generated by a person (e.g., the customer), the instructions can cause the system to output a person-focused recording for the customer.

The disclosed technology includes a system for automatically interfacing with an automated voicemail service. The system can receive audio data associated with a call to a customer device (e.g., user device) and can detect an utterance from the audio data. The system can perform a first comparison of the utterance to stored linguistic data and can determine, based on the first comparison, a detected language associated with the call. The system can perform a second comparison of the utterance to stored voicemail greeting data. The stored voicemail greeting data can include default greeting data and customized greeting data. The default greeting data can be indicative of one or more default voicemail greetings, and the customized greeting data can be indicative of a saved customized voicemail greeting associated with the customer (e.g., user). The system can determine, based on the second comparison, whether the utterance was generated by the automated voicemail service. In response to determining the utterance was generated by the automated voicemail service, the system can identify, based on the second comparison, a greeting message duration associated with the utterance and can output a voicemail-focused recording for the customer subsequent to expiration of the greeting message duration. In response to determining the utterance was not generated by the automated voicemail service, the system can output a person-focused recording for the customer, and the person-focused recording can include information of a higher level of confidentiality than the voicemail-focused recording.

Further features of the disclosed design, and the advantages offered thereby, are explained in greater detail hereinafter with reference to specific embodiments illustrated in the accompanying drawings, wherein like elements are indicated be like reference designators.

BRIEF DESCRIPTION OF THE DRAWINGS

Reference will now be made to the accompanying drawings, which are not necessarily drawn to scale, and which are incorporated into and constitute a portion of this disclosure, illustrate various implementations and aspects of the disclosed technology and, together with the description, serve to explain the principles of the disclosed technology. In the drawings.

DETAILED DESCRIPTION

Figure 1:
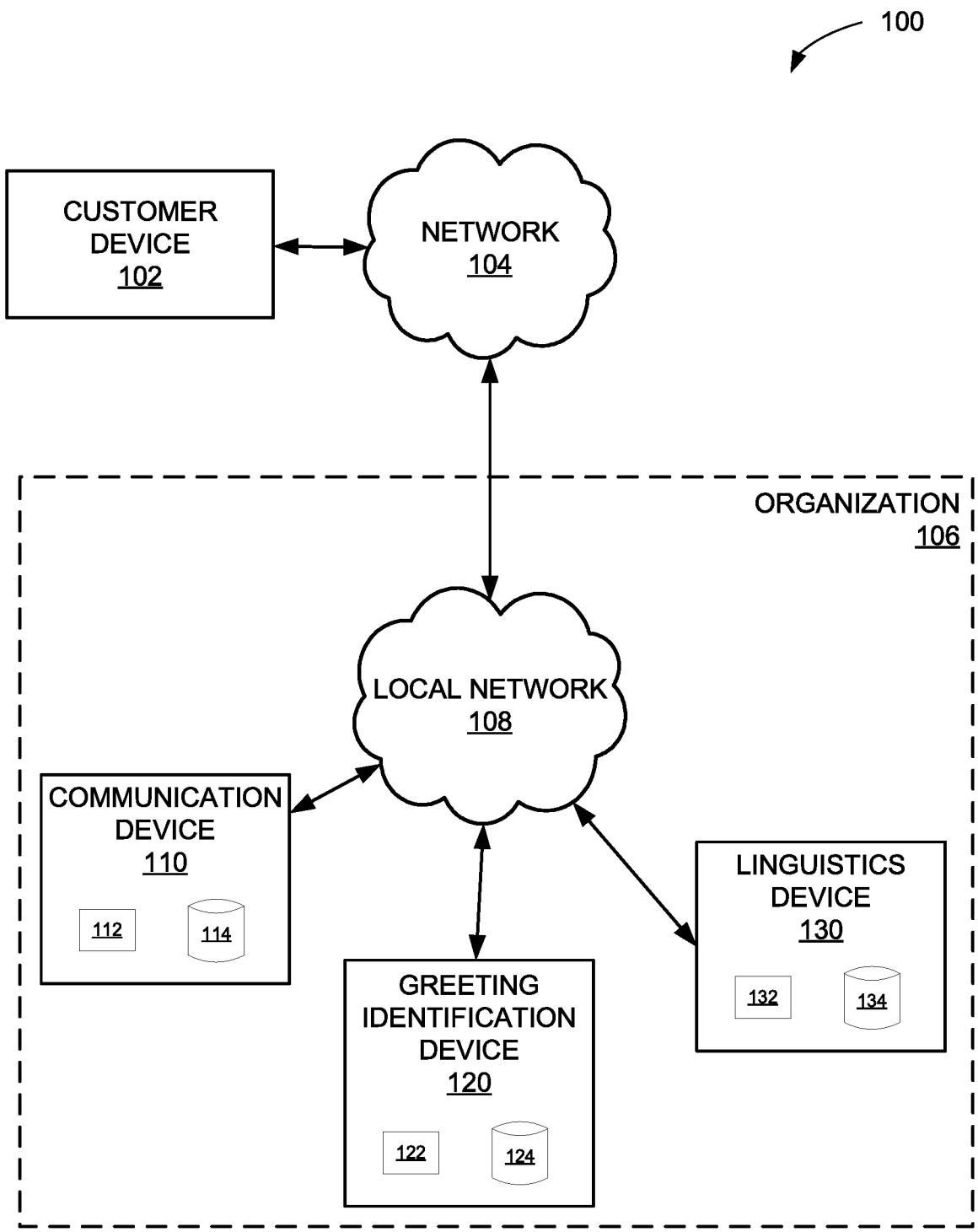
FIG. 1 illustrates a diagram of an example system for identifying the answering party of an automated voice call, in accordance with the disclosed technology.

Throughout this disclosure, systems and methods are described with respect to identifying the answering party of an automated voice call (e.g., a telephone call). More specifically, the disclosed technology includes systems and methods for identifying and/or determining whether an automated voice call has been answered by a customer, a person who is not the customer, and/or a voicemail service (e.g., an automated voicemail service). Those having skill in the art will recognize that the disclosed technology can be applicable to multiple scenarios and applications.

Some implementations of the disclosed technology will be described more fully with reference to the accompanying drawings. This disclosed technology may, however, be embodied in many different forms and should not be construed as limited to the implementations set forth herein. The components described hereinafter as making up various elements of the disclosed technology are intended to be illustrative and not restrictive. Indeed, it is to be understood that other examples are contemplated. Many suitable components that would perform the same or similar functions as components described herein are intended to be embraced within the scope of the disclosed electronic devices and methods. Such other components not described herein may include, but are not limited to, for example, components developed after development of the disclosed technology.

Herein, the use of terms such as "having," "has," "including," or "includes" are open-ended and are intended to have the same meaning as terms such as "comprising" or "comprises" and not preclude the presence of other structure, material, or acts. Similarly, though the use of terms such as "can" or "may" are intended to be open-ended and to reflect that structure, material, or acts are not necessary, the failure to use such terms is not intended to reflect that structure, material, or acts are essential. To the extent that structure, material, or acts are presently considered to be essential, they are identified as such.

It is to be understood that the mention of one or more method steps does not preclude the presence of additional method steps or intervening method steps between those steps expressly identified. Similarly, it is also to be understood that the mention of one or more components in a device or system does not preclude the presence of additional components or intervening components between those components expressly identified.

As used herein, unless otherwise specified, the use of the ordinal adjectives "first," "second," "third," etc., to describe a common object, merely indicate that different instances of like objects are being referred to, and are not intended to imply that the objects so described must be in a given sequence, either temporally, spatially, in ranking, or in any other manner.

As used herein, unless otherwise specified, the terms and/or phrases, "real-time," "substantially real-time," "instantaneously," and "substantially instantaneously" each refer to processing and/or displaying data without intentional delay, given the processing limitations of the system (e.g., the limitations of one or more processors and/or memory of the system) and the time required to accurately measure and/or display the data.

Although the disclosed technology may be described herein with respect to various systems, non-transitory computer-readable mediums having instructions stored thereon, and methods, it is contemplated that embodiments or implementations of the disclosed technology with identical or substantially similar features may alternatively be implemented as methods, systems, and/or non-transitory computer-readable media. For example, any aspects, elements, features, or the like described herein with respect to a method can be equally attributable to a system and/or a non-transitory computer-readable medium. As another example, any aspects, elements, features, or the like described herein with respect to a system can be equally attributable to a method and/or a non-transitory computer-readable medium. As yet another example, any aspects, elements, features, or the like described herein with respect to a non-transitory computer-readable medium can be equally attributable to a system and/or a method.

Reference will now be made in detail to example embodiments of the disclosed technology, examples of which are illustrated in the accompanying drawings and disclosed herein. Wherever convenient, the same references numbers will be used throughout the drawings to refer to the same or like parts.

FIG. 1 illustrates a diagram of an example system 100 that can be configured to perform one or more processes described herein. The components and arrangements shown in FIG. 1 are not intended to limit the disclosed embodiments as the components used to implement the disclosed processes and features may vary. As shown, system 100 can include a customer device 102, which can be connected to an organization 106 via a network 104. Organization 106 can include, for example, a communication device 110, which can include one or more processors 112 and one or more memory devices 114; a greeting identification device 120, which can include one or more processors 122 and one or more memory devices 124; and/or a linguistics device 130, which can include one or more processors 132 and one or more memory devices 134. Some or all of the various devices and/or components of organization 106 can be connected by a local network 108, and local network 108 can be connected to network 104. Alternatively or additionally, one, some, or all of the various devices and/or components of organization 106 can be in direct communication with customer device 102, such as by an RF radio. Although certain devices and/or components are shown as being separate in FIG. 1, it should be understood that some or all of the elements, devices, and/or components of organization 106 can be combined together into a single device and/or into one or more devices or components.

Organization 106 can be associated with an entity such as a business, corporation, individual, partnership, or any other entity. For example, organization 106 can be associated with an entity that can provide financial services or processing of financial transactions such as a bank, a credit card company, or the like. As another example, organization 106 can be associated with an entity that provides goods and services.

The customer device 102 can be configured to be operated by a customer of organization 106. Customer device 102 can be or include one or more of a mobile device, smart phone, general purpose computer, tablet computer, laptop computer, telephone, a public switched telephone network (PSTN) landline, smart wearable device, voice command device, other mobile computing device, or any other device capable of communicating with network 104 and/or one or more components of organization 106. One or more components of organization 106 (e.g., local network 108, communication device 110, greeting identification device 120, linguistics device 130) can be capable of communicating with network 104 and/or customer device 102. Organization 106 (or any component thereof) can include one or more of a mobile device, smart phone, general purpose computer, tablet computer, laptop computer, telephone, a public switched telephone network (PSTN) landline, smart wearable device, voice command device, other mobile computing device, or any other device capable of communicating with network 104 and/or customer device 102. Customer device 102 can belong to, or be provided by, the customer, or can be borrowed, rented, or shared. Users of customer device 102 can include individuals such as, for example, customers, subscribers, clients, prospective clients, or customers of an entity associated with organization 106 and/or a third party, such as a third party associated with organization 106.

Figure 2:
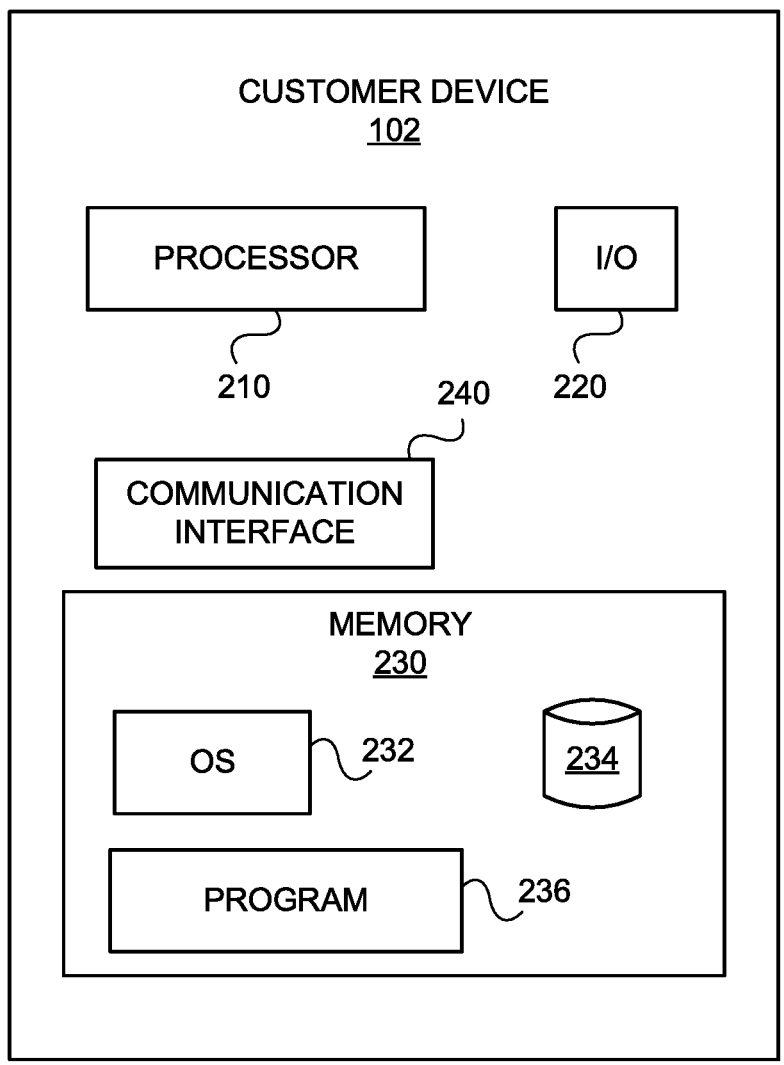
FIG. 2 illustrates a component diagram of an example customer device, in accordance with the disclosed technology.

An example customer device 102 is shown in more detail in FIG. 2. As shown, customer device 102 can include a processor 210; an input/output (I/O) device 220; memory 230, which can include an operating system (OS) 232, a storage device 234, which may be any suitable repository of data, and a program 236; and a communication interface 240, such as a transceiver for sending and receiving data (e.g., via Wi-Fi, cellular communications). Customer device 102 can include a user interface (U/I) device for receiving user input data, such as data representative of a click, a scroll, a tap, a press, a spatial gesture (e.g., as detected by one or more accelerometers and/or gyroscopes), or typing on an input device that can detect tactile inputs. Customer device 102 can include an environmental sensor for obtaining audio or visual data (e.g., a microphone and/or digital camera), a display for displaying images, and/or a speaker for outputting audio.

Customer device 102 can include a peripheral interface, which can include hardware, firmware, and/or software that enables communication with various peripheral devices, such as media drives (e.g., magnetic disk, solid state, or optical disk drives), other processing devices, or any other input source used in connection with the instant techniques. A peripheral interface can include a serial port, a parallel port, a general-purpose input and output (GPIO) port, a game port, a universal serial bus (USB), a micro-USB port, a high definition multimedia (HDMI) port, a video port, an audio port, a Bluetooth™ port, an NFC port, another like communication interface, or any combination thereof.

Processor 210 may include one or more of an application specific integrated circuit (ASIC), programmable logic device, microprocessor, microcontroller, digital signal processor, co-processor or the like or combinations thereof capable of executing stored instructions and operating upon stored data. Processor 210 can include a secure microcontroller, which can be configured to transmit and/or facilitate secure lines of communication. Some or all of the processing techniques described herein can be implemented as a combination of executable instructions and data within memory 230. Processor 210 can implement virtual machine technologies, or other similar known technologies, to provide the ability to execute, control, run, manipulate, store, etc. multiple software processes, applications, programs, etc. One of ordinary skill in the art would understand that other types of processor arrangements could be implemented that provide for the capabilities disclosed herein.

Customer device 102 may include one or more storage devices 234 configured to store information used by processor 210 (or other components) to perform certain functions related to the disclosed embodiments. As an example, customer device 102 may include memory 230 that includes instructions to enable processor 210 to execute one or more applications, network communication processes, and any other type of application or software known to be available on computer systems. Alternatively, the instructions, application programs, etc. may be stored in an external storage or available from a memory over a network. The one or more storage devices may be a volatile or non-volatile, magnetic, semiconductor, tape, optical, removable, non-removable, or other type of storage device or tangible computer-readable medium.

Memory 230 can include one or more memory devices that store data and instructions used to perform one or more features of the disclosed technology. Memory 230 can include one or more suitable types of memory (e.g., volatile or non-volatile memory, random access memory (RAM), read only memory (ROM), programmable read-only memory (PROM), erasable programmable read-only memory (EPROM), electrically erasable programmable read-only memory (EEPROM), magnetic disks, optical disks, floppy disks, hard disks, removable cartridges, flash memory, a redundant array of independent disks (RAID), and the like) for storing files including operating system 232, application programs 236 (including, for example, a web browser application, a widget or gadget engine, and or other applications, as necessary), executable instructions and data. Memory 230 can include any combination of one or more databases controlled by memory controller devices (e.g., one or more servers, etc.) or software, such as document management systems, Microsoft™ SQL databases, SharePoint™ databases, Oracle™ databases, Sybase™ databases, or other relational databases. Memory 230 can include software components that, when executed by processor 210, perform one or more processes consistent with the disclosed technology.

Customer device 102 can be communicatively connected to one or more memory devices (e.g., databases (not shown)) locally or through a network (e.g., network 104). The remote memory devices can be configured to store information and may be accessed and/or managed by customer device 102. Systems and methods consistent with disclosed embodiments, however, are not limited to separate databases or even to the use of a database.

While customer device 102 has been described with respect to its implementation and/or integration into the techniques described herein, those having ordinary skill in the art will appreciate that other functionally equivalent techniques may be employed. For example, as known in the art, some or all of the functionality implemented via executable instructions may also be implemented using firmware and/or hardware devices such as application specific integrated circuits (ASICs), programmable logic arrays, state machines, etc. Furthermore, implementations of the customer device 102 can include a greater or lesser number of components than those illustrated. Some implementations of the customer device 102 can exclude certain components discussed herein. For example, customer device 102 may not include an OS, depending on the complexity of the program instructions. Embodiments not including an OS may have comparative limited functionality but may also decrease the power consumption of customer device 102, decrease the manufacturing complexity of customer device 102, and/or decrease the complexity of customer-usability for customer device 102 (e.g., how difficult a customer might find customer device 102 to use).

Referring back to FIG. 1, network 104 can be of any suitable type, including individual connections via the internet such as cellular or Wi-Fi networks. Network 104 can connect terminals, services, and mobile devices using direct connections such as RFID, NFC, Bluetooth™, BLE, Wi-Fi™, ZigBee™, ABC protocols, USB, WAN, or LAN. Because the information transmitted may be personal or confidential, security concerns can dictate that one or more of these types of connections be encrypted or otherwise secured. If the information being transmitted is less personal, the network connections can be selected for convenience over security.

Network 104 may comprise any type of computer networking arrangement used to exchange data. For example, network 104 can be the Internet, a private data network, virtual private network using a public network, and/or other suitable connection(s) that enables components in system 100 to send and receive information between the components of system 100. Alternatively or additionally, network 104 can include a PSTN and/or a wireless network.

Organization 106 can include one or more servers, devices, and computer systems for performing one or more functions associated with products and/or services that organization 106 provides. Such servers, devices, and computer systems can include, for example, local network 108, communication device 110, greeting identification device 120, and/or linguistics device 130, as well as any other computer systems necessary to accomplish tasks associated with organization 106 or the needs of customers (which may be customers of an entity associated with organization 106).

Local network 108 may comprise any type of computer networking arrangement used to exchange data in a localized area, such as WiFi, Bluetooth™ Ethernet, and other suitable network connections that enable components of organization 106 to interact with one another and to connect to network 104 for interacting with components in system 100. Local network 108 can comprise an interface for communicating with or linking to network 104. Alternatively or additionally, one, some, or all components of organization 106 can communicate via network 104 without a separate local network 108.

Communication device 110 can include one or more processors 112 and one or more memory devices 114 storing executable instructions that, when executed by the processor(s) 112, cause communication device 110 to perform various steps for identifying and/or determining who or what has answered an automated voice call, according to the technology disclosed herein. For example, communication device 110 can be configured to communicate with customer device 102, such as via network 104 and/or local network 108, and can be configured to perform various steps for identifying who or what has answered an automated call based on the communication with the customer device 102 or a voicemail service associated with customer device 102, which can include a third-party device or server (not shown) managing or operating an automated voicemail service for the customer device, for example.

Greeting identification device 120 can include one or more processors 122 and one or more memory devices 124 storing executable instructions that, when executed by the processor(s) 122, cause greeting identification device 120 to perform various steps for identifying and/or determining who or what has answered an automated voice call, according to the technology disclosed herein. For example, greeting identification device 120 can compare a detected utterance (e.g., one or more sounds detected from audio data associated with a call to customer device 102) to stored data (e.g., stored in memory 124) indicative of a default voicemail greeting (e.g., a default voicemail greeting of a telecommunications provider associated with customer device 102). Based on the identified default voicemail greeting, the greeting identification device 120 can determine a duration associated with that particular default voicemail greeting and can delay output of the recording for the customer until the duration has expired. This can help ensure that the customer is able to hear the entire recording when he or she checks the related voicemail message. As another example, greeting identification device 120 can compare a detected utterance to stored data (e.g., stored in memory 124) indicative of a customized voicemail greeting associated with the customer. If the level of similarity between the detected utterance and the stored data indicative of the customized voicemail greeting is greater than or equal to a predetermined threshold, greeting identification device 120 can determine that the utterance is associated with a known voicemail service and thus, the call has been answered by a voicemail service (e.g., an automated voicemail service). Conversely, if the level of similarity is below the predetermined threshold, greeting identification device 120 can determine that the utterance is not associated with a known voicemail service and thus, the call has been answered by a person, such as the customer.

Linguistics device 130 can include one or more processors 132 and one or more memory devices 134 storing executable instructions that, when executed by the processor(s) 132, cause linguistics device 130 to perform various steps for identifying and/or determining who or what has answered an automated voice call, according to the technology disclosed herein. For example, linguistics device 130 can recognize or detect a language associated with the utterance. If the recognized or detected language is different from a default language associated with the customer and/or customer device 102, linguistics device 130 can update a profile associated with the customer and/or customer device 102 to include the recognized or detected language. Alternatively or additionally, linguistics device 130 can provide an updated recording in the recognized or detected language for the customer. This may facilitate increased or easier understanding of the message by the customer. For example, the organization 106 may typically provide messages in English, but Spanish may be the primary language of the customer (or Spanish may be the only language spoken by the customer). In such a scenario, linguistics device 130 can determine from the customer's voicemail greeting that the customer is a Spanish speaker and can provide the message in Spanish (instead of the original English version) for output to the customer's as a voicemail message.

While various aspects and functionalities of the organization 106 as described with respect to certain components or devices, it is to be understood that some or all of the aspects, attributes, and functionalities of the disclosed technology can be performed by a single component or device, or any other combination of components or devices (i.e., not necessarily those expressly described herein). For example, a single backend device or server can, in some scenarios, be configured to perform all of the functionalities of the disclosed technology.

Figure 3:
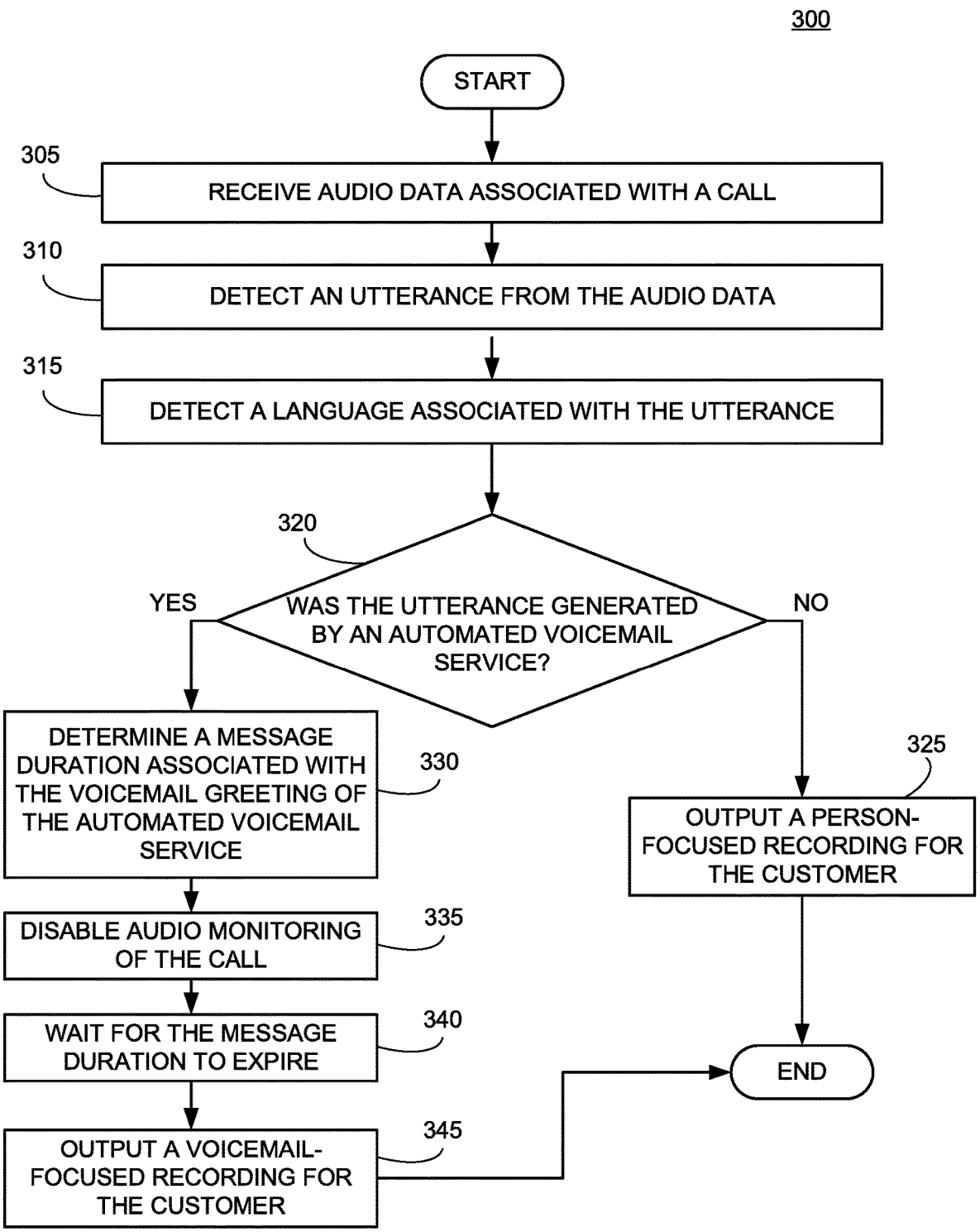
FIG. 3 illustrates a flowchart showing an example method for identifying the answering party of an automated voice call, in accordance with the disclosed technology.

FIG. 3 shows a flowchart of a method 300 for determining whether an automated voice call has been answered by a customer, a person who is not the customer, and/or a voicemail service (e.g., an automated voicemail service). Method 300 can be performed by some or all of local network 108, communication device 110, greeting identification device 120, and/or linguistics device 130, or any useful combination thereof.

In block 305, method 300 can include receiving (e.g., by communication device 110) audio data from customer device 102. If the communication method is telephony-based, the received data will be limited to audio data. The conversation can include other data in addition to audio data, however, such as if the communication method is a video conference or the like (e.g., additional data can be received, such as video data). In block 310, method 300 can include detecting an utterance from the audio data. In block 315, method 300 can include detecting a language associated with the utterance (e.g., by linguistics device 130). Method 300 can include outputting one or more messages in a default language, such as English. If a language different from the default language is detected from the utterance, it can be assumed that the customer associated with the customer device 102 speaks a language different from the default language. As such, method 300 can include changing the default language associated with the customer and/or the customer device 102 to the detected language (e.g., updating a profile associated with the customer and/or the customer device 102 to reflect the detected language) such that future messages can be formatted in the detected language. Alternatively or additionally, method 300 can include translating the current message (that is in the default language) to a message having the same content but expressed in the detected language, such that the updated message in the detected language can be outputted for the customer.

At block 320, method 300 can include determining whether the utterance was generated by an automated voicemail service. Method 300 can include one or more processes for determining whether the utterance was generated by an automated voicemail service, such one or both of the processes illustrated by FIGS. 4 and 5.

Figure 4:
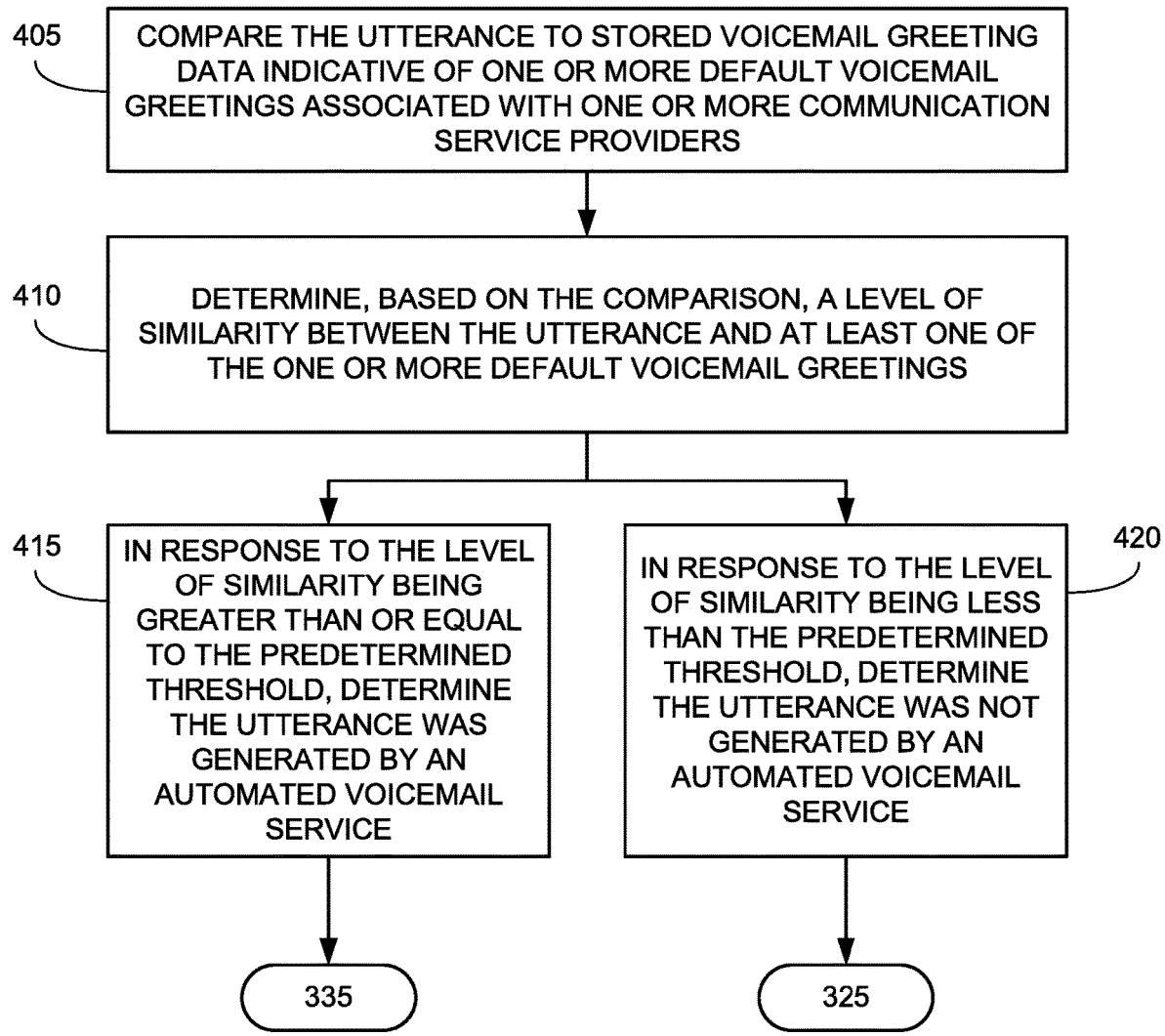
FIG. 4 illustrates a flowchart showing an example method for determining whether a detected utterance was generated by an automated voicemail service, in accordance with the disclosed technology.

Referring to FIG. 4, the determination of whether the utterance was generated by an automated voicemail service at block 320 can include comparing (e.g., by greeting identification device 120) the utterance to stored voicemail greeting data that is indicative of one or more default voicemail greetings associated with one or more communication service providers, as shown at block 405. The stored voicemail greeting data can include a database of default greetings associated with various communication service providers (e.g., telecommunications organizations). Because communication service providers typically provide a default voicemail greeting for subscribers, it is possible to determine that an automated voicemail service has answered a call if a corresponding default voicemail greeting can be recognized. And because different communication service providers may have different default voicemail greetings, it can be helpful to maintain a database of these default voicemail greetings. Further, the database of default voicemail greetings can include a record of default voicemail greetings across any number of languages. Optionally, the database can be periodically updated by attaining updates (either by actively requesting or passively receiving) that can include new default voicemail greetings for one or more communication service providers.

At block 410, method 300 can include determining, based on the comparison of the utterance to the stored voicemail greeting data, a level of similarity between the utterance and at least one of the one or more default voicemail greetings. Determining the level of similarity can include determining a percentage of the utterance that is identical to at least one of the one or more default voicemail greetings. Alternatively or additionally, determining the level of similarity can include determining an amount of time during which the utterance is identical to at least one of the one or more default voicemail greetings. Alternatively or additionally, determining the level of similarity can include determining a percentage of the utterance and/or an amount of time during which the utterance is sufficiently similar to, but not necessarily identical to, (e.g., 99% the same, 95% the same, 90% the same, 85% the same) at least one of the one or more default voicemail greetings. Alternatively or additionally, determining the level of similarity can include analyzing the audio characteristics of the utterance (e.g., pitch; range; relative volume of terms, phrases, or syllables) and comparing the audio characteristics of the utterance to audio characteristics of one or more default voicemail greetings.

At block 415, method 300 can include determining the utterance was generated by an automated voicemail service in response to the level of similarity being greater than or equal to a first predetermined threshold. For example, a sufficient level of similarity (i.e., a level of similarity greater than or equal to the first predetermined threshold) can correspond to determining, at block 410, that at least a predetermined duration of the utterance is identical or substantially identical to at least one of the one or more default voicemail greetings (e.g., 3 seconds). As another example, a sufficient level of similarity can correspond to determining, at block 410, that at least some of the audio characteristics are sufficiently similar (e.g., a 100% match, a 99% match, a 95% match, a 90% match, an 85% match) to the audio characteristics of one or more default voicemail greetings. To prevent false positives, it can be useful to require a 100% match of audio characteristics. Alternatively, however, it can be useful to require a lesser degree of similarity (e.g., a 90% match), which can account for poor telecommunications connections and other factors that could can affect audio characteristics of the utterance and/or stored voicemail greeting data. A sufficient level of similarity can require a sufficiently similar audio characteristics over a minimum duration. For example, a 100% match of audio characteristics for 1 second may result in a sufficiently level of similarity, whereas a 90% match is required for 3 seconds to result in a sufficient level of similarity.

At block 420, method 300 can include determining the utterance was not generated by an automated voicemail service in response to the level of similarity being less than the first predetermined threshold.

Figure 5:
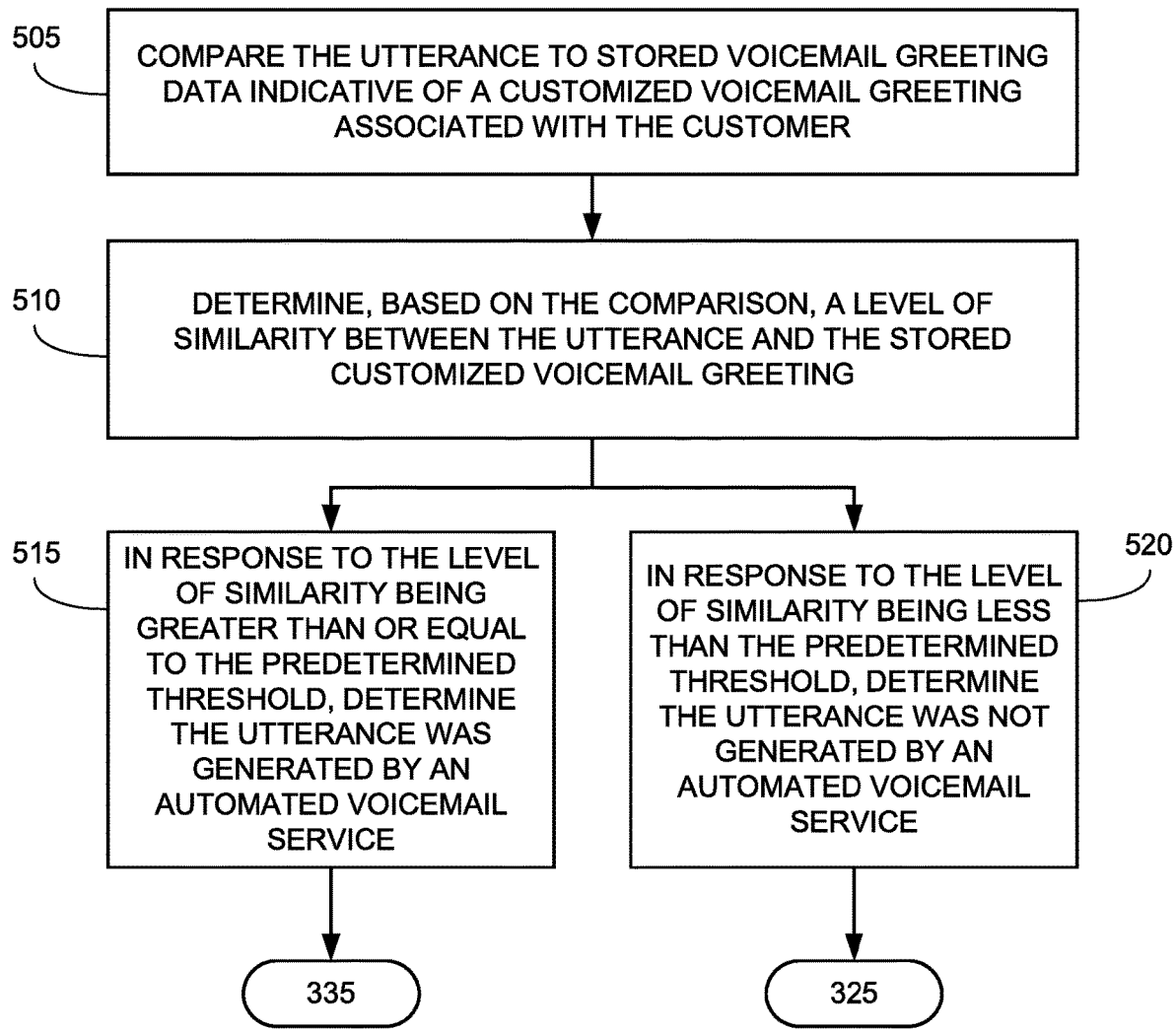
FIG. 5 illustrates a flowchart showing another example method for determining whether a detected utterance was generated by an automated voicemail service, in accordance with the disclosed technology, in accordance with the disclosed technology.

Alternatively or in addition to the process shown in FIG. 4, referring now to FIG. 5, at block 505, the determination of whether the utterance was generated by an automated voicemail service of block 320 can include comparing (e.g., by greeting identification device 120) the utterance to stored voicemail greeting data that is indicative of a customized voicemail greeting associated with the customer and/or the customer device 102. The comparing at block 505 can be substantially similar to the comparing at block 405, except that the utterance is compared to stored voicemail greeting data that is indicative of a customized voicemail greeting rather than or in addition to one or more default voicemail greetings as in block 405. The voicemail greeting data indicative of the customized voicemail greeting message can be saved in the same memory as any voicemail greeting data indicative of default voicemail greeting messages, or the voicemail greeting data indicative of the customized voicemail greeting message can be saved at a different location. At block 510, method 300 can include determining, based on the comparison of the utterance to the stored voicemail greeting data, a level of similarity between the customized voicemail greeting message. At block 515, method 300 can include determining the utterance was generated by an automated voicemail service in response to the level of similarity being greater than or equal to a second predetermined threshold. The determining at block 510 can be substantially similar to the determining at block 410, except that the utterance is compared to stored voicemail greeting data that is indicative of a customized voicemail greeting rather than or in addition to one or more default voicemail greetings as in block 410. At 520, method 300 can include determining the utterance was not generated by an automated voicemail service in response to the level of similarity being less than the second predetermined threshold.

In some implementations, blocks 405 and/or 505 can include parsing the utterance for phrases and comparing the detected phrases to a database of phrases that are typically indicative of a voicemail greeting message and comparing the detected phrases the database of typical voicemail greeting message phrases can include determining a level of similarity based on the comparison. If the level of similarity is greater than or equal to a predetermined threshold, the system can determine that a voicemail service provider has answered the call, but if the level of similarity is less than the predetermined threshold, the system can determine that a person has answered the call. Alternatively or additionally, blocks 405 and/or 505 can include comparing the detected phrases to a database of phrases that are typical of a conversation with a person (and not a voicemail service provider). Based on that comparison, blocks 410 and/or 510 can include determining a level of similarity. If that level of similarity is greater than or equal to the predetermined threshold, the system can determine that a person answered the call, but if the level of similarity is less than the predetermined threshold, the system can determine that a voicemail service provider answered the call. Method 300 can include implementing a machine learning programing to identify phrases that indicative of a voicemail service provider answering a call and/or phrases that are indicative of a person answering a call (or a specific person answering a call). The machine learning program can make determinations regarding the answering party based on the identified phrases and can later verify whether that determination was correct. For example, the machine learning program can use the audible "beep" or other indication that a voicemail message is being recorded as a confirmation that a voicemail service provider answered the call. As another example, the machine learning program can ask an answering party (e.g., a person) to verify whether a person answered the call (e.g., by a contextual answer to a question posed during the call, by pressing a button on the customer device 102 during the call). The machine learning program can thus iteratively increase the accuracy by which the program can identify the answering party of an automated call to the customer device 102.

Alternatively or additionally, method 300 can include counting the number of rings that occurred before an answering party answered the call. The number of detected or counted rings during the call can be compared to historical call data for that particular customer, that particular customer device 102, and/or the communications service provider associated with the customer device 102. Based on the comparison, the blocks 410 and/or 510 can include determining a level of similarity between the number of rings associated with the call and historical data indicating a number of rings typically associated with a voicemail service answering the call for that particular customer, that particular customer device 102, and/or the communications service provider associated with the customer device 102. If the level of similarity is greater than or equal to a predetermined threshold, the system can determine that a voicemail service provider has answered the call, but if the level of similarity is less than the predetermined threshold, the system can determine that a person has answered the call.

Returning to FIG. 3, if it is determined that the utterance was not generated by an automated voicemail service (e.g., by way of one of the processes described with respect to FIGS. 4 and 5), method 300 can include determining that the utterance was spoken by a person (i.e., the call was answered by a person). In block 325, method 300 can include outputting a person-focused recording for the customer. A person-focused recording can include a message that is different from a voicemail-focused message. For example, a voicemail-focused message can include a low-sensitivity message (e.g., upcoming events), whereas a person-focused message can include a comparatively higher-sensitivity message (e.g., a current balance of the customer's financial account, a bill due date).

Optionally, as part of block 325, the system can determine whether the person who answered the call is the customer himself or herself. This can include detecting voice biometric data from the utterance (e.g., audio characteristics associated with the utterance) and comparing the voice biometric data to stored customer biometric data. The stored customer biometric data can have its own audio characteristics. The stored voice biometric data (e.g., baseline voice biometric data) can include voice biometric data associated with the customer that was collected during an initial setup process and/or that was collected during previous interactions with the customer or from previous interactions with a customer voicemail greeting associated with the customer. Alternatively or additionally, the stored voice biometric data can include voice biometric data associated with the customer that was collected by a different system associated with organization 106. For example, the stored voice biometric data can include voice biometric data associated with the customer that was collected by any system of device of organization 106 that validated the customer's identity (e.g., by PIN, password, biometrics confirmation). The system can determine, based on the comparison of the voice biometric data to the stored customer biometric data, a level of similarity between the voice biometric data and the stored customer biometric data. If the level of similarity is greater than or equal to a third predetermined threshold, method 300 can include determining that the person who answered the call is the customer. Conversely, if the level of similarity is less than the third predetermined threshold, method 300 can include determining that the person who answered the call is a person who is not the customer. Method 300 can include outputting different messages depending whether the customer, or a person who is not the customer, answered the call. example, a person-focused message for a person who is not the customer can include a low-sensitivity message (e.g., upcoming events), whereas a person-focused message for the customer himself or herself can include a comparatively higher-sensitivity message (e.g., a current balance of the customer's financial account).

Conversely, if it is determined that the utterance was generated by an automated voicemail service (e.g., by way of one of the processes described with respect to FIGS. 4 and 5), at block 330, method 300 can include determining a message duration associated with the voicemail greeting of the automated voicemail service. The message duration can be indicative of a period of time from the start of the voicemail greeting message until the audible "beep" or other indication from the voicemail service provider that a voicemail message is being recorded. Method 300 can include, at block 335, disabling of audio monitoring after determining a message duration and can include, at block 340, waiting for the message duration to expire before outputting a message or recording. Because the message duration is now known, the appropriate time to begin outputting a message (so that the entire message is recorded by the voicemail service provider) is also now known. Thus, a system implementing method 300 can save processing power by disabling further audio monitoring of the call. At block 345, method 300 can include outputting a voicemail-focused recording for the customer. As mentioned above, the voicemail-focused recording can be a message that is different in content from a person-focused recording. Optionally, method 300 can include initiating a subsequent customer contact attempt. The subsequent customer contact attempt can include attempting to contact the customer device 102 at a later time, a different day, a different time of day, or the like. Alternatively or additionally, the subsequent customer contact attempt can include attempting to contact the customer via a different communication channel and/or via a different customer device. For example, in addition to leaving a voicemail-focused recording (or a person-focused recording for a person who is not the customer, which can also be referenced as a generalized person-focused recording), the system can initiate a subsequent contact attempt for the customer by initiating an email message, a push notification (e.g., via a related computing application), a text message, a letter by post, or the like.

As used in this application, the terms "component," "module," "system," "server," "processor," "memory," and the like are intended to include one or more computer-related units, such as but not limited to hardware, firmware, a combination of hardware and software, software, or software in execution. For example, a component may be, but is not limited to being, a process running on a processor, an object, an executable, a thread of execution, a program, and/or a computer. By way of illustration, both an application running on a computing device and the computing device can be a component. One or more components can reside within a process and/or thread of execution and a component may be localized on one computer and/or distributed between two or more computers. In addition, these components can execute from various computer readable media having various data structures stored thereon. The components may communicate by way of local and/or remote processes such as in accordance with a signal having one or more data packets, such as data from one component interacting with another component in a local system, distributed system, and/or across a network such as the Internet with other systems by way of the signal.

Certain embodiments and implementations of the disclosed technology are described above with reference to block and flow diagrams of systems and methods and/or computer program products according to example embodiments or implementations of the disclosed technology. It will be understood that one or more blocks of the block diagrams and flow diagrams, and combinations of blocks in the block diagrams and flow diagrams, respectively, can be implemented by computer-executable program instructions. Likewise, some blocks of the block diagrams and flow diagrams may not necessarily need to be performed in the order presented, may be repeated, or may not necessarily need to be performed at all, according to some embodiments or implementations of the disclosed technology.

These computer-executable program instructions can be loaded onto a general-purpose computer, a special-purpose computer, a processor, or other programmable data processing apparatus to produce a particular machine, such that the instructions that execute on the computer, processor, or other programmable data processing apparatus create means for implementing one or more functions specified in the flow diagram block or blocks. These computer program instructions can also be stored in a computer-readable memory that can direct a computer or other programmable data processing apparatus to function in a particular manner, such that the instructions stored in the computer-readable memory produce an article of manufacture including instruction means that implement one or more functions specified in the flow diagram block or blocks.

As an example, embodiments or implementations of the disclosed technology can provide for a computer program product, including a computer-usable medium having a computer-readable program code or program instructions embodied therein, said computer-readable program code adapted to be executed to implement one or more functions specified in the flow diagram block or blocks. Likewise, the computer program instructions can be loaded onto a computer or other programmable data processing apparatus to cause a series of operational elements or steps to be performed on the computer or other programmable apparatus to produce a computer-implemented process such that the instructions that execute on the computer or other programmable apparatus provide elements or steps for implementing the functions specified in the flow diagram block or blocks.

Accordingly, blocks of the block diagrams and flow diagrams support combinations of means for performing the specified functions, combinations of elements or steps for performing the specified functions, and program instruction means for performing the specified functions. It will also be understood that each block of the block diagrams and flow diagrams, and combinations of blocks in the block diagrams and flow diagrams, can be implemented by special-purpose, hardware-based computer systems that perform the specified functions, elements or steps, or combinations of special-purpose hardware and computer instructions.

Certain implementations of the disclosed technology are described above with reference to customer devices or user devices, which can include mobile computing devices. Those skilled in the art recognize that there are several categories of mobile devices, generally known as portable computing devices that can run on batteries but are not usually classified as laptops. For example, mobile devices can include, but are not limited to portable computers, tablet PCs, internet tablets, PDAs, ultra-mobile PCs (UMPCs), wearable devices, and smart phones. Additionally, implementations of the disclosed technology can be utilized with internet of things (IoT) devices, smart televisions and media devices, appliances, automobiles, toys, and voice command devices, along with peripherals that interface with these devices.

In this description, numerous specific details have been set forth. It is to be understood, however, that implementations of the disclosed technology can be practiced without these specific details. In other instances, well-known methods, structures and techniques have not been shown in detail in order not to obscure an understanding of this description. References to "one embodiment," "an embodiment," "some embodiments," "example embodiment," "various embodiments," "one implementation," "an implementation," "example implementation," "various implementations," "some implementations," etc., indicate that the implementation(s) of the disclosed technology so described can include a particular feature, structure, or characteristic, but not every implementation necessarily includes the particular feature, structure, or characteristic. Further, repeated use of the phrase "in one implementation" does not necessarily refer to the same implementation, although it may.

Throughout the specification and the claims, the following terms take at least the meanings explicitly associated herein, unless the context clearly dictates otherwise. The term "or" is intended to mean an inclusive "or." Further, the terms "a," "an," and "the" are intended to mean one or more unless specified otherwise or clear from the context to be directed to a singular form. By "comprising" or "containing" or "including" is meant that at least the named component, element, or method step is present in the device or system or method, but does not exclude the presence of other compounds, materials, particles, method steps, even if the other such components, elements, or method steps have the same function as what is named.

While certain embodiments of this disclosure have been described in connection with what is presently considered to be the most practical and various embodiments, it is to be understood that this disclosure is not to be limited to the disclosed embodiments, but on the contrary, is intended to cover various modifications and equivalent arrangements included within the scope of the appended claims. Although specific terms are employed herein, they are used in a generic and descriptive sense only and not for purposes of limitation.

This written description uses examples to disclose certain embodiments of the technology and also to enable any person skilled in the art to practice certain embodiments of this technology, including making and using any apparatuses or systems and performing any incorporated methods. The patentable scope of certain embodiments of the technology is defined in the claims, and can include other examples that occur to those skilled in the art. Such other examples are intended to be within the scope of the claims if they have structural elements that do not differ from the literal language of the claims, or if they include equivalent structural elements with insubstantial differences from the literal language of the claims.

Exemplary Use Cases

The following exemplary use cases describe examples of a typical user flow pattern. They are intended solely for explanatory purposes and not in limitation. When an organization (e.g., organization 106) places an automated call to a customer (e.g., at a customer device 102), it can be difficult for the organization's automated calling system to determine whether the call has been answered by an automated voicemail service or an actual person. Further, it can be difficult for the organization's automated calling system to determine whether the call has been answered by the customer or a different person who is not the customer. Further still, the organization may desire or be required to alter the content of the message depending on whether the call has been answered by the customer, the customer's voicemail service, or a person who is not the customer. To address some or all of these problems, the organization can include a system configured to identify the answering party of an automated call to the customer.

The system can place a call to the customer via a telephone or computer (e.g., customer device 102), and the system can receive audio data associated with the call. The system can detect an utterance from the audio data, which can include any number of sounds, such as words, phrases, and the like. Optionally, the system can detect a language associated with the utterance, which can be particularly beneficial if the detected language is different from a presumed or default language associated with the customer. If the detected language is different, the system can later provide a message in the detected language, which can increase the likelihood that the customer will understand the system's message.

The system can determine whether the utterance was generated by an automated voicemail service. One method of making this determination can include comparing the utterance to stored data indicative of default voicemail greetings (e.g., default voicemail greetings associated with various telecommunications service providers). If a level of similarity between the utterance and one of the stored default voicemail greetings is greater than or equal to a predetermined threshold, the system can determine that an automated voicemail service answered the call. However, if the level of similarity between the utterance and one of the stored default voicemail greetings is less than the predetermined threshold, the system can determine that a person answered the call. Another method of determining whether the utterance was generated by an automated voicemail service can include comparing the utterance to stored data indicative of a customized voicemail greeting associated with the customer (e.g., a greeting recorded by the customer in the customer's voice). If a level of similarity between the utterance and the customized voicemail greeting is greater than or equal to a predetermined threshold, the system can determine that the automated voicemail service answered the call. However, if the level of similarity between the utterance and one of the customized voicemail greeting is less than the predetermined threshold, the system can determine that a person answered the call.

If the system determines a person answered the call, the system can perform a voice biometrics check to ensure the person answering the call is the customer. To do so, the system can detect voice biometric data from the utterance (which has already been determined to be associated with spoken words from a person), and the system can compare the voice biometric data to stored biometric data associated with and unique to the customer. If a level of similarity between the detected voice biometric data and the stored biometric data is greater than or equal to a predetermined threshold, the system can determine the person who answered the call is the customer. If, however, the level of similarity between the detected voice biometric data and the stored biometric data is less than the predetermined threshold, the system can determine the person who answered the call is a different person who is not the customer. Regardless, the system can output a person-focused recording for the answering party. If the system has determined that the answering party is the customer, the system can output a customer-specific, person-focused recording, and if the system has determined that the answering party is not the customer, the system can output a more generic person-focused recording.

If the system determines the utterance was generated by an automated voicemail service, the system can determine a message duration associated with the voicemail greeting of the automated voicemail service, which can help with the timing of outputting a message to be recorded by the automated voicemail service. The message duration can be determined, for example, based on historical data associated with the previously identified default voicemail greeting, customized voicemail greeting, or the like. The system can delay output of the recording or message such that the system does not begin playing the recording or message until the automated voicemail service has begun recording a voicemail message for the customer. Optionally, the system can also disable audio monitoring of the call once the message duration has been determined, which can help save on processing power of the system. Once the system has determined that the automated voicemail service has begun recording the voicemail message for the customer, the system can output a voicemail-focused recording for the customer. The voicemail-focused recording can have content that is different from the content of a related person-focused recording. For example, a voicemail-focused recording can have content that is generic, non-personalized, and/or non-sensitive, whereas a person-focused recording—and particularly a customer-specific person-focused recording—can include sensitive information for the customer.

If the customer did not answer the call (i.e., the automated voicemail service answered), the system can attempt to contact the customer at a later time, via a different communication channel, and/or via a different communication device. The decision as to whether attempt to contact the customer at a later time, via a different communication channel, and/or via a different communication device can be based at least in part on an importance level or timeliness level associated with the content of the message.

Certain implementations of the disclosed technology are described above with reference to block and flow diagrams of systems and methods and/or computer program products according to example implementations of the disclosed technology. It will be understood that one or more blocks of the block diagrams and flow diagrams, and combinations of blocks in the block diagrams and flow diagrams, respectively, can be implemented by computer-executable program instructions. Likewise, some blocks of the block diagrams and flow diagrams may not necessarily need to be performed in the order presented, may be repeated, or may not necessarily need to be performed at all, according to some implementations of the disclosed technology.

These computer-executable program instructions can be loaded onto a general-purpose computer, a special-purpose computer, a processor, or other programmable data processing apparatus to produce a particular machine, such that the instructions that execute on the computer, processor, or other programmable data processing apparatus create means for implementing one or more functions specified in the flow diagram block or blocks. These computer program instructions can also be stored in a computer-readable memory that can direct a computer or other programmable data processing apparatus to function in a particular manner, such that the instructions stored in the computer-readable memory produce an article of manufacture including instruction means that implement one or more functions specified in the flow diagram block or blocks. As an example, implementations of the disclosed technology can provide for a computer program product, including a computer-usable medium having a computer-readable program code or program instructions embodied therein, said computer-readable program code adapted to be executed to implement one or more functions specified in the flow diagram block or blocks. Likewise, the computer program instructions can be loaded onto a computer or other programmable data processing apparatus to cause a series of operational elements or steps to be performed on the computer or other programmable apparatus to produce a computer-implemented process such that the instructions that execute on the computer or other programmable apparatus provide elements or steps for implementing the functions specified in the flow diagram block or blocks.

What is claimed is:

1. A method for automatically interfacing with an automated voicemail service, the method comprising:
   storing historical ring data comprising individualized historical ring data associated with each of a plurality of contact identifiers;
   receiving audio data associated with a call to one of the plurality of contact identifiers that is associated with a user device associated with a user;
   detecting, from the audio data, one or more audible rings of an internal ring tone indicative of a pending attempt to connect the call;
   detecting, from the audio data, that the call is connected;
   determining a total number of the one or more audible rings that occurred before the call was answered;
   comparing the total number of the one or more audible rings to the individualized historical ring data associated with the one of the plurality of contact identifiers that is associated with the call to determine a likelihood that the call has been answered by the automated voicemail service; and
   in response to determining the likelihood that the call has been answered by the automated voicemail service is greater than or equal to a predetermined threshold that is associated with the individualized historical ring data and is specific to the one of the plurality of contact identifiers that is associated with the call, outputting a voicemail-focused recording for the user.

2. The method of claim 1 further comprising:
   in response to determining the likelihood that the call has been answered by the automated voicemail service is less than the predetermined threshold, outputting a person-focused recording for the user, the person-focused recording comprising information of a higher level of confidentiality than the voicemail-focused recording.

3. A non-transitory, computer-readable medium having instructions stored thereon that, when executed by one or more processors, causes a system to:
receive audio data associated with a call to a user device associated with a user;
detect an utterance from the audio data;
perform a comparison of the utterance to stored data comprising data indicative of one or more voicemail greetings and a message duration for each of the one or more voicemail greetings;
identify, based on the comparison, a voicemail greeting of the one or more voicemail greetings to determine that the utterance was generated by an automated voicemail service;
identify, based on the stored data, a message duration associated with the identified voicemail greeting, the message duration being indicative of an amount of time associated with the identified voicemail greeting; and
in response to determining the utterance was generated by the automated voicemail service, output a voicemail-focused recording for the user after the message duration has expired.

4. The computer-readable medium of claim 3, wherein:
the call is a video call, and
the instructions, when executed by the one or more processors, further cause the system to:
receive video call data comprising video data and the audio data; and
extract the audio data from the video call data.

5. The computer-readable medium of claim 3, wherein:
the identified voicemail greeting is a default voicemail greeting, and
determining that the utterance was generated by the automated voicemail service comprises:
determining, based on the comparison, a level of similarity between the utterance and data indicative of the default voicemail greeting of the one or more voicemail greetings, and
determining that the level of similarity is greater than or equal to a predetermined threshold.

6. The computer-readable medium of claim 3, wherein the instructions, when executed by the one or more processors, further cause the system to:
in response to identifying the message duration, disable audio monitoring of the call to save processing power.

7. The computer-readable medium of claim 3, wherein the instructions, when executed by the one or more processors, further cause the system to:
record the utterance;
detect an audible prompt to begin recording a voicemail;
determine a message duration associated with the utterance, the message duration being indicative an amount of time between the call becoming connected and detection of the audible prompt to begin recording the voicemail;
store the message duration and data indicative of the utterance in the stored data; and
output the voicemail-focused recording in response to detecting the audible prompt.

8. The computer-readable medium of claim 3, wherein the instructions, when executed by the one or more processors, further cause the system to:
initiate an attempt to contact the user via a communication path that is different from the call.

9. The computer-readable medium of claim 3, wherein:
the identified voicemail greeting is a saved customized voicemail greeting associated with the user, and
determining that the utterance was generated by the automated voicemail service comprises:
determining, based on the comparison, a level of similarity between the utterance and the data indicative of the saved customized voicemail greeting associated with the user, and
determining that the level of similarity is greater than or equal to a predetermined similarity threshold.

10. The computer-readable medium of claim 9, wherein:
the predetermined similarity threshold is a first predetermined similarity threshold, and
the instructions, when executed by the one or more processors, further cause the system to:
in response to determining the level of similarity is less than the first predetermined similarity threshold, output a person-focused recording comprising information different from information of the voicemail-focused recording.

11. The computer-readable medium of claim 9, wherein:
the predetermined similarity threshold is a first predetermined similarity threshold, and
the instructions, when executed by the one or more processors, further cause the system to, in response to determining the level of similarity is less than the first predetermined similarity threshold:
detect voice biometric data associated with the audio data;
perform an identification comparison of the voice biometric data to stored voice biometric data associated with the user to determine an identification level of similarity between the voice biometric data and the stored voice biometric data; and
in response to determining that the identification level of similarity is greater than or equal to a second predetermined similarity threshold, output a user-specific person-focused recording that includes confidential information associated with the user.

12. The computer-readable medium of claim 11, wherein the instructions, when executed by the one or more processors, further cause the system to:
in response to determining that the identification level of similarity is less than the second predetermined similarity threshold, output a generalized person-focused recording that omits confidential information associated with the user.

13. The computer-readable medium of claim 11, wherein the instructions, when executed by the one or more processors, further cause the system to:
detect baseline voice biometric data associated with the user during an audio interaction with the user; and
store the baseline voice biometric data as the stored voice biometric data.

14. The computer-readable medium of claim 3, wherein the instructions, when executed by the one or more processors, further cause the system to:
detect baseline voice biometric data associated with a customized voicemail greeting associated with the user; and
store the baseline voice biometric data as the stored voice biometric data.

15. The computer-readable medium of claim 3, wherein:
the voicemail-focused recording is associated with a default language,
the instructions, when executed by the one or more processors, further cause the system to determine that the utterance is associated with a call-answer language that is different from the default language, and
outputting the voicemail-focused recording comprises outputting an updated voicemail-focused recording that is associated with the call-answer language.

16. The computer-readable medium of claim 15, wherein the instructions, when executed by the one or more processors, further cause the system to:
associate the call-answer language with the user in a preferred language database.

17. A system for automatically interfacing with an automated voicemail service, the system being configured to:
receive audio data associated with a call to a user device;
detect an utterance from the audio data;
perform a first comparison of the utterance to stored linguistic data;
determine, based on the first comparison, a detected language associated with the call;
perform a second comparison of the utterance to stored voicemail greeting data comprising default greeting data and customized greeting data, the default greeting data being indicative of one or more default voicemail greetings and the customized greeting data being indicative of a saved customized voicemail greeting associated with a user associated with the user device;
determine, based on the second comparison, whether the utterance was generated by the automated voicemail service;
in response to determining the utterance was generated by the automated voicemail service:
identify, based on the second comparison, a greeting message duration associated with the utterance; and
output a voicemail-focused recording for the user subsequent to expiration of the greeting message duration; and
in response to determining the utterance was not generated by the automated voicemail service, output a person-focused recording for the user, the person-focused recording comprising information of a higher level of confidentiality than the voicemail-focused recording.

* * * * *